United States Patent [19]

Diepers

[11] 4,349,760

[45] Sep. 14, 1982

[54] CURRENT TRANSFER BRUSH WITH GRAPHITE FOILS

[75] Inventor: Heinrich Diepers, Höchstadt, Fed. Rep. of Germany

[73] Assignee: Siemens Aktiengesellschaft, Munich, Fed. Rep. of Germany

[21] Appl. No.: 195,315

[22] Filed: Oct. 9, 1980

[30] Foreign Application Priority Data

Oct. 31, 1979 [DE] Fed. Rep. of Germany ....... 2944065

[51] Int. Cl.[3] ........................................... H02K 13/00

[52] U.S. Cl. ................................................. 310/248

[58] Field of Search ............................... 310/248–253, 310/239; 428/607; 314/60; 313/357; 13/18 C

[56] References Cited

U.S. PATENT DOCUMENTS

| | | | |
|---|---|---|---|
| 3,382,387 | 5/1968 | Marshall | 310/248 |
| 3,509,400 | 4/1970 | Conrath | 310/248 |
| 3,525,006 | 8/1970 | Parr | 310/251 |
| 3,939,977 | 2/1976 | Forster | 310/248 |

FOREIGN PATENT DOCUMENTS

| | | | |
|---|---|---|---|
| 2817371 | 10/1979 | Fed. Rep. of Germany | 310/253 |
| 2817402 | 10/1979 | Fed. Rep. of Germany | 310/251 |
| 639062 | 12/1978 | U.S.S.R. | 310/258 |

*Primary Examiner*—R. Skudy

*Attorney, Agent, or Firm*—Kenyon & Kenyon

[57] ABSTRACT

A current transfer brush which contains a sliding member is composed of graphite foils which are disposed in a stacked arrangement, at least some of which graphite foils are partially coated with an electrically conductive material. At least one thin mat or felt of highly graphitized graphite fibers is coated with an electrically conductive material and interposed between ajacent ones of the graphite foils in the stack. The interposition of such a graphite mat or felt produces a substantial reduction in the brush fire and brush abrasion which results when the brush is placed in electrical contact with a rotating contact member, such as a slip ring or a commutator, of an electric machine. The friction between the current transfer brush and the rotating contact element may be reduced in some embodiments by coating the graphite fibers in the graphite mat or felt with a friction reducing material.

7 Claims, 2 Drawing Figures

CURRENT TRANSFER BRUSH WITH GRAPHITE FOILS

BACKGROUND OF THE INVENTION

This invention relates generally to current transfer brushes for electric machines, and more particularly, to a sliding stack arrangement of graphite foils, each of which is provided with a layer of electrically conducting material.

Current transfer brushes which are in general use for transferring electric current from a supply circuit to a rotating member of an electric machine are generally formed of electrographite, which may consist of natural graphite or a mixture of a metal and graphite. Such graphite brushes are known to possess the characteristics of high electrical conductivity and low friction between the brush and the rotating member of the electric machine, illustratively a slip ring or commutator. The principal operational characteristics of such brushes are determined by the coefficient of friction $\mu$, which is a function of the relative velocity between the brush and the rotating machine part, and by the voltage drop $\Delta V$, wich is a function of the density of the current which is conducted by the brush. The values of both such quantities are directly related to a surface skin which is formed on the rotating contact member of the electrical machine. Such a surface skin is called film or patina, and is composed of the materials of the brush and the rotating contact member which are abraded during operation. The thickness and composition of the surface skin is related to a variety of factors, including the material composition of the graphite of the brush, the composition of the rotating contact member, the current density, the relative velocity between the brush and the rotating member, and the temperature of the contact member. In addition, the nature of the surface skin is affected by the contact pressure between the brush and rotating member, and a variety of variable factors including atmospheric conditions, air humidity, and the presence of chemical gases and vapors.

One current transfer brush which may conduct a high density of current with low contact pressure and abrasion is disclosed in German Offenlegungsschrift No. 28 17 371. The sliding member of the brush described therein contains a multiplicity of graphite foils which are composed of highly graphitized graphite and combined in a stack. The graphite material used in the brush contains a high percentage of crystallized graphite. Each such foil may be provided with a layer of an electrically conducting material on at least one side, so as to reduce the resistance of the brush and the corresponding voltage drop. In operation, the brush is disposed so that the edges of the foils in the stack contact the rotating member of the electrical machine.

It is a problem with the stack-type current transfer brush described in the German patent reference that the contact resistance disadvantageously increases with the relative velocity of the rotating machine member. Such an increase in resistance results from the fact that the slip rings or commutators used in the electric machines are not perfectly round. Thus, even minute eccentricities in the slip rings or commutators will cause the relatively inflexible graphite foils to separate from the slip rings or commutators. A separation of even a few micrometers leads to the so-called "brush fire" which causes an increase in the electrical contact resistance and in the rate of material removal. Such brush fire is generally difficult to surpress.

One prior art attempt to improve stack-type brushes is disclosed in German Offenlegungsschrift No. 28 17 402. This reference teaches a current transfer brush which is more flexible than that described in German Offenlegungsschrift No. 28 17 371 by including mats or felts of highly graphitized graphite fibers in the stack arrangement. However, although the brush containing the mats or felts is flexible, such a flexible brush nevertheless exhibits strong brush fire and high rate of material loss during operation.

It is, therefore, an object of this invention to improve current transfer brushes of the type which utilize graphite foils in a stack so as to reduce the occurrence of brush fire without increasing the rate of material removal.

SUMMARY OF THE INVENTION

The foregoing and other objects are achieved by this invention which provides a current transfer brush having a plurality of graphite foils arranged in a stack. The graphite foils are at least partially coated with an electrically conducting material. The arrangement further contains at least one mat or felt of graphite fibers which are coated with an electrically conducting material disposed between adjacent graphite foils.

The inclusion of a metalized graphite fiber mat or felt in the stack structure of the current transfer brush not only provides a more flexible arrangement than stacks having only graphite foils, but the metalized fibers serve to short circuit what would otherwise be an open circuit when the brush momentarily separates from an imperfectly round rotating member. In addition to suppressing brush fire, the abrasion of the sliding brush is advantageously reduced, illustratively, by as much as one order of magnitude or more as compared to brushes having only graphite foils. In addition, voltage variations for a given current are substantially reduced.

BRIEF DESCRIPTION OF THE DRAWINGS

Comprehension of the invention is facilitated by reading the following detailed description in conjunction with the annexed drawings in which.

DETAILED DESCRIPTION

Figure 1:
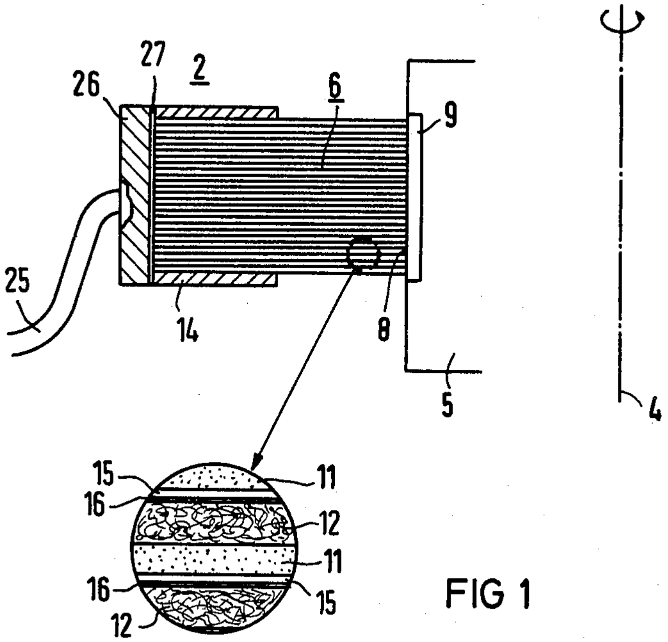
FIG. 1 is a schematic cross-sectional representation of a current transfer brush in accordance with the principles of the invention.

FIG. 1 shows a current transfer brush 2 which is rigidly held in place by a stationary machine part (not shown) so as to be in contact with a rotating machine part 5. Rotating machine part 5 is not completely shown in the figure, and rotates about an axis 4. Current transfer brush 2 is provided with a sliding member 6 which slidably contacts a cylindrical outer running surface of a contact member 9. Contact member 9 may be a commutator or a slip ring of a three-phase machine. Sliding member 6 of current transfer brush 2 contains a stack arrangement containing a multiplicity of metalized graphite foils 11, shown in the enlarged section view. In one embodiment, metalized graphite fiber mats 12, or felts, are disposed between at least some of the foils. In the specific embodiment, the graphite foils 11 and the graphite fiber mats 12 are held together as a stack by a frame element 14, which may be formed of copper, and is disposed at a distal portion from the cylindrical outer running surface 8.

Current transfer brush 2 is arranged with respect to running surface 8 of contact member 9 so that graphite foils 11 and graphite fiber mats 12 are perpendicular to running surface 8. Moreover, the flat sides of the foils and mats lie in planes which are orthogonal to axis of rotation 4 of the rotating machine part. Thus, the edges of the foils and mats in sliding member 6 are in contact with cylindrical outer running surface 8 in such a manner that excessive bending of the individual foils and mats in the direction of rotation is prevented. This insures that sliding member 6 will present a substantially constant dimension at the contact surface, not withstanding that the sliding member is more flexible than prior art sliding members which consist only of graphite foils. In electrical equipment, such as three-phase machines, which utilize slip rings instead of commutators as contact members, the current transfer brush may be arranged so that graphic foils 11 and graphite fiber mats 12 lie in planes which are parallel to axis of rotation 4.

An operative embodiment of sliding member 6 may contain highly graphitized graphite foils 11 which are commercially available and have a high degree of graphite crystallization. One such commercially available graphite foil is the material "Sigraflex" of the SIGRI Elektrographit Gmbh, D-8901 Meitingen. The foils are produced by the thermal decomposition of graphite embedment compounds, which produces graphite flakes. The graphite flakes are pressed or rolled into foils of graphite material which are advantageously substantially anisotropic without the addition of fillers or binders. The highly graphitized graphite foils which are usable in the structure of current transfer brush 2 are less than 1 mm in thickness, and preferably less than 200 $\mu$m. Using graphite material which has a raw density of 1 g/cm$^3$, at 20° C. an electric resistivity of $10^3$ $\mu$ohm.cm and a thermal conductivity of 200 W/mK are achieved longitudinally along the foil. An electrical resistivity of $6.5\times10^4$ $\mu$ohm.cm and a thermal conductivity of 7 W/mK are achieved in a direction perpendicular to the foil.

Each graphite foil 11 is coated on at least one side with a layer 15 of highly conductive material, illustratively copper, silver, or an alloy. A layer of silver or a double layer of silver and chromium are preferred. The layers can be applied by known thin-film techniques such as electroplating, chemical electroless plating, plasma or ion plating, sputtering, or vapor deposition. Vapor deposition technique is preferred because it provides good adhesion between the layer material and the graphite foil. During the deposition of the layer, the temperature of the foil should not be raised greater than 100° C. to avoid excessive outgassing which reduces the strength of the adhesion.

The thickness of layer 15 may be between 0.1 $\mu$m and 500 $\mu$m, and preferably between 1 $\mu$m and 50 $\mu$m. As further shown in FIG. 1, the layers 15 of electrically conducting material may be covered with an additional thin layer 16 which serves primarily to protect layer 15 from corrosion. Layer 16 may, for example, be of cobalt, chromium, or nickel. Such a layer 16 will protect a silver layer 15 against the effects of sulfur contained in the atmosphere.

In the specific illustrative embodiment of FIG. 1, graphite foils 11 are shown coated on only one side. However, a current transfer brush may be constructed in accordance with the principles of the invention by using graphite foils which are coated on both sides with one or several layers. Additionally, each side of each graphite foil may be coated with layers of different thicknesses or materials.

The metalized graphite fiber mats 12 which are provided between graphite foils 11 of the current transfer brush may be constructed of commercially available mats, consisting of cut-short short random highly graphitized graphite fibers with a high degree of graphite crystallization, such as from the Toray Industries, Inc., Tokyo, Japan; Torayca mat AO-010. Such mats have illustrative densities of 10 g/m$^3$ and a thickness of less than 0.5 mm, preferably less than 100 $\mu$m. The graphite fibers may be prepared with a polyacrylnitril base. The graphite fiber pieces of the mat are mechanically held together by a binder, illustratively a phenolformalin synthetic resin. The resin content in the mat should be approximately 5 to 9% by weight. The fibers of the graphite mat 12 are then coated with an electrically conducting material, illustratively, copper or an alloy. A silver layer is preferred.

Figure 2:
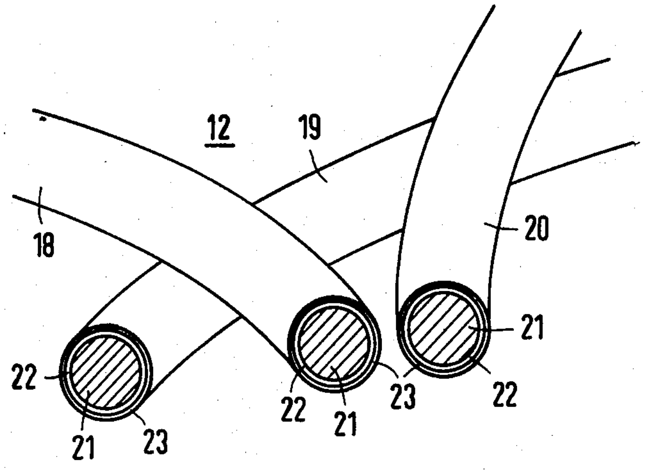
FIG. 2 is an enlarged section view of a schematic representation of a graphite fiber mat for use in the current transfer brush.

FIG. 2 shows a highly magnified schematic representation of three highly graphitized graphite fiber particles 18, 19, and 20 of a graphite mat 12. Each graphite fiber piece contains a graphite fiber core 21 surrounded by a layer 22 of electrically conductive material. Layer 22 may be applied by known thin film techniques such as by electroless deposition or by electro-plating. Physical processes such as metalization of the fibers by ion plating are particularly advantageous. The thickness of the layers of electrically conducting material may be between 0.1 $\mu$m and 50 $\mu$m, and preferably between 0.3 $\mu$m and 5 m.

FIG. 2 further shows that layers 22 of the electrically conducting material are covered, in this embodiment, by an additional thin layer 23. In machines which are to be utilized in dry climates, it may be advantageous to apply friction reducing layers of molybdenum disulfide $MoS_2$ or niobium diselenide $NbSe_2$ by ion plating. Layers 23 serve to protect layers 22 from corrosion.

The stacks of graphite foils 11 and graphite fiber mats 12 in sliding member 6 of FIG. 1 are difficult to connect by sodering means to a current supply or drain. The foils and mats should be electrically coupled at their ends which lie within the copper frame 14. Thus, in this embodiment, the foil and mat ends are connected in an electrically conducting manner to a contact plate 26 which is connected to a current conducting lead 25, illustratively, a flexible copper cable, by means of a layer 27 of an electrically conductive adhesive.

In one illustrative embodiment, a current transfer brush according to the invention contains 50 graphite foils, each 100 $\mu$m thick, approximately 5 cm long and 2 cm wide. The foil material consists of commercially available graphite foils (SIGRI: Sigraflex-F). The foil material exhibits strong anisotropy as to its thermal and electrical conductivities. Each graphite foil is provided on both sides with a silver layer which is 5 $\mu$m thick. Graphite fiber mats having a raw density of 10 g/m$^3$ are arranged between adjacent graphite coils. The graphite fiber mats are 80 $\mu$m thick, approximately 5 cm long, and 2 cm wide. A commercially available fiber mat material is employed (Toray: Torayca mat A0-010). The mat material exhibits strong anisotropic characteristics with respect to its thermal and electrical conductivities, as does the graphite foil material. The fibers of the graphite fiber mat are provided with a silver layer approximately 1 $\mu$m thick, by sputtering. The graphite foils and graphite fiber mats which are combined in a stack are held in a copper frame having a square inner opening of 2 cm by 2 cm, and connected electrically to a flexible copper wire by means of a copper plate which is affixed to the end of the stack by a conductive silver paste. The contact member of the rotating machine is a slip ring consisting of chrome-nickel-steel which rotates under the current transfer brush with a velocity of 40 m/s. The current through the brush is adjusted so as to be within a current carrying density of 20 A/cm$^2$. A voltage drop $\Delta V$ of approximately 0.9 V for positive polarity and of approximately 1.2 V for negative polarity is distributed across the brush including the contact zone. The abrasion of such a brush is only about 1 mm per 1,000 hours.

In view of the teaching herein, persons of skill in the art can optimally adapt the current transfer brush to different machine types by a suitable choice of thickness and raw density of the graphite foils and graphite fiber mats, the thickness of the metal layers, and the packing or stacking density. The current density throughout the brush may be advantageously adjusted through the use of coated and uncoated foils and mats, or differently heavily coated foils and mats in predetermined arrangements. Thus, for example, foils and mats which are uncoated or are only thinly coated so as to have less conductive material thereon will have a consequently higher resistance and can be used as the leading and trailing brush edges respectively. The ratio of metalized graphite foils to metalized graphite fiber mats 12 within a stack of a current transfer brush may be varied within wide limits, without departing from the scope of the invention. The foil-to-mat ration can, for example, be 1:1, as in the specific embodiment of FIG. 1, or it may be larger, such as 10:1.

Although the inventive concept disclosed herein has been described in terms of specific embodiments and applications, other applications and embodiments will be obvious to persons skilled in the pertinent art without departing from the scope of the invention. The drawings and descriptions of specific embodiments of the invention in this disclosure are illustrative of applications of the invention and should not be construed to limit the scope thereof. Accordingly, it should be understood that the current transfer brush described herein is not limited for use in electrical machines having rotating cylindrical contact surfaces. The brush may also be used to conduct current to and from stationary, elongated supply rails.

What is claimed is:

1. A current transfer brush having a sliding element containing a plurality of highly graphitized graphite foils, the graphite foils each having foil surfaces and being disposed in a stacked arrangement wherein the foil surfaces of each graphite foil are substantially parallel to the foil surfaces of an adjacent graphite foil, the current transfer brush having a contact surface substantially perpendicular to the foil surfaces of the graphite foils, at least one such graphite foil being at least partially coated with an electrically conductive material, the current transfer brush being characterized in that there is further provided at least one sheet of highly graphitized graphite fibers interposed between adjacent ones of the graphite foils, said graphite fibers being coated with an electrically conductive material.

2. The current transfer brush of claim 1 wherein the number of graphite foils and the number of said graphite fiber sheets disposed therebetween have a ratio with respect to each other which is between 1:1 and 10:1.

3. The current transfer brush of claim 1 wherein the thickness of said graphite fiber sheet is less than 0.5 mm.

4. The current transfer brush of claim 3 where there are further provided a plurality of said graphite fiber sheets, said graphite sheets having different thicknesses from one another.

5. The current transfer brush of claim 4 wherein there is provided a coating of friction reducing material applied to said graphite fibers of said graphite fiber sheets.

6. The current transfer brush of claim 1 wherein the contact surface of the current transfer brush is in electrical contact with a rotating contact member of an electrical machine, the contact surface of the brush being substantially parallel to an axis of rotation of said rotating contact member.

7. The current transfer brush of claim 1 wherein said graphite fibers in said graphite fibers sheet are coated with an electrically conductive material which is the same as that which at least partially coats the graphite foils.

* * * * *